US012632859B2

(12) United States Patent
Singh et al.

(10) Patent No.: US 12,632,859 B2
(45) Date of Patent: May 19, 2026

(54) HYBRID CONSENSUS MECHANISMS IN DISTRIBUTED TRUST COMPUTING NETWORKS IMPLICATING PROOF OF GEOGRAPHIC LOCATION

(71) Applicant: BANK OF AMERICA CORPORATION, Charlotte, NC (US)

(72) Inventors: Raghubir Singh, Jammu and Kashmir (IN); Samiran Das, Telangana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 151 days.

(21) Appl. No.: 18/226,419

(22) Filed: Jul. 26, 2023

(65) Prior Publication Data

US 2025/0037123 A1 Jan. 30, 2025

(51) Int. Cl.
*G06Q 20/40* (2012.01)
*G06Q 20/38* (2012.01)
*G06Q 40/02* (2023.01)

(52) U.S. Cl.
CPC ......... *G06Q 20/401* (2013.01); *G06Q 20/389* (2013.01); *G06Q 40/02* (2013.01)

(58) Field of Classification Search
CPC ..... G06Q 20/401; G06Q 20/389; G06Q 40/02
See application file for complete search history.

(56) References Cited

U.S. PATENT DOCUMENTS

| | | | |
|---|---|---|---|
| 10,158,492 B2 | 12/2018 | Pearce | |
| 10,887,108 B2 | 1/2021 | Yang | |
| 10,956,377 B2 | 3/2021 | Todd et al. | |
| 11,410,171 B2 | 8/2022 | Li et al. | |
| 11,520,904 B2 | 12/2022 | Sanghvi et al. | |
| 11,695,741 B2 | 7/2023 | Tali et al. | |
| 11,736,456 B2 | 8/2023 | Manevich et al. | |
| 11,757,627 B2 | 9/2023 | Monica et al. | |
| 2019/0370793 A1 | 12/2019 | Zhu et al. | |
| 2019/0386995 A1* | 12/2019 | Chafe | G06Q 20/065 |
| 2020/0162261 A1 | 5/2020 | Iyer | |
| 2020/0313855 A1 | 10/2020 | Yin | |
| 2020/0387910 A1* | 12/2020 | Ponceleon | G06F 16/27 |
| 2021/0281980 A1* | 9/2021 | Xu | H04L 9/3239 |
| 2021/0399900 A1 | 12/2021 | Andreina et al. | |
| 2022/0173888 A1 | 6/2022 | Shi et al. | |
| 2023/0017790 A1 | 1/2023 | Xiao et al. | |
| 2023/0245080 A1 | 8/2023 | Anderson | |
| 2024/0039958 A1* | 2/2024 | Yannuzzi | H04L 63/20 |

* cited by examiner

*Primary Examiner* — Raven E Yono

(74) *Attorney, Agent, or Firm* — Moore & Van Allen PLLC; Nicholas C. Russell

(57) ABSTRACT

Validation/authorization of nodes within a distributed trust computing network for participation in consensus mechanisms. The validation/authorization is based at least on current geo-location of the node being within predefined geo-location boundaries. Geo-location of a node may be proven by receiving geo-coordinates from a geo-receiver connected to the node and in synch with a geo-satellite or, when geo-signals are unavailable, through secondary geo-receivers. Additionally, validation/authorization of nodes for participation in consensus mechanisms is based further on whether the node currently holds digital property or holds a specified amount of digital property.

15 Claims, 7 Drawing Sheets

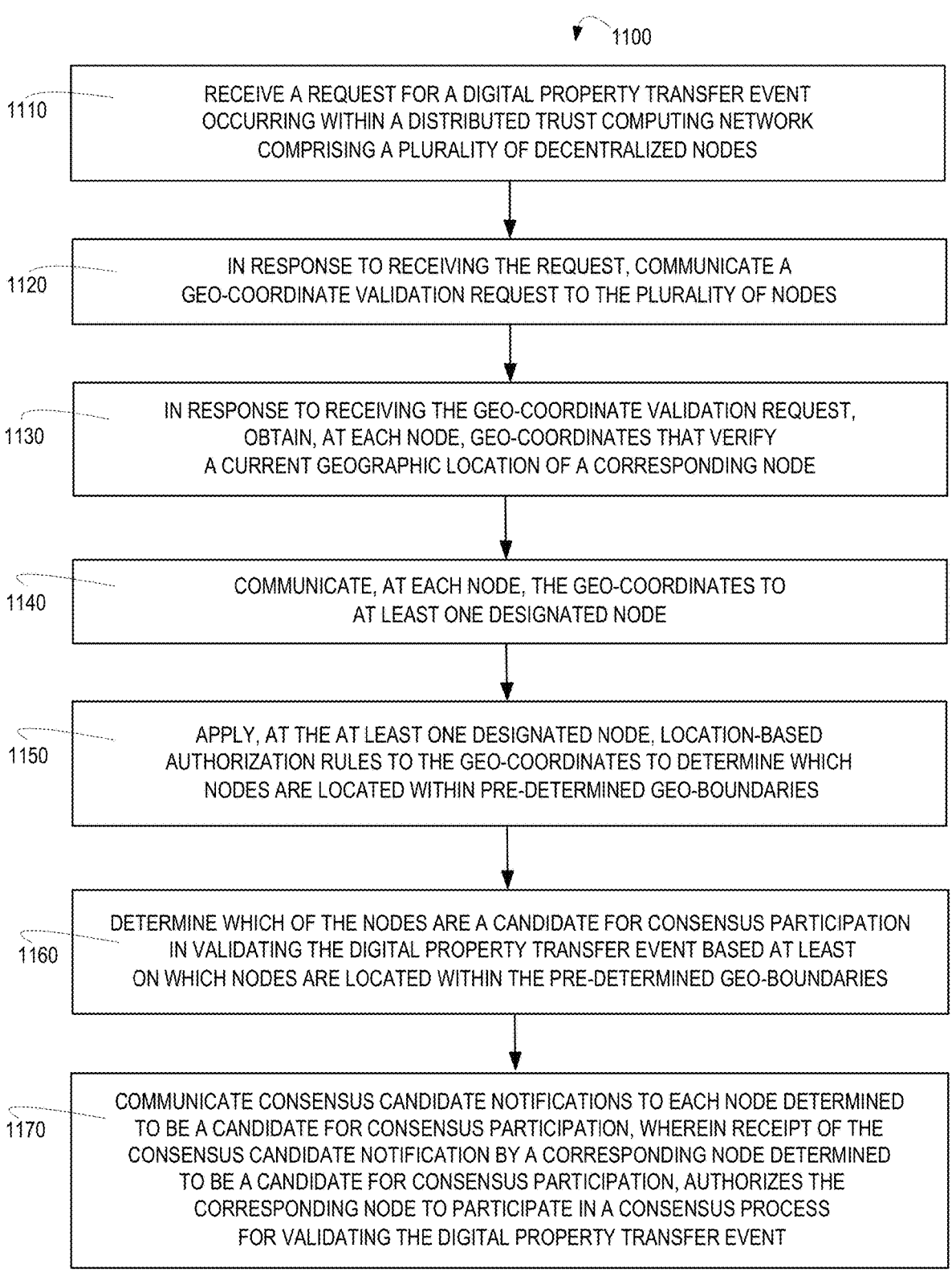

1100

1110 — RECEIVE A REQUEST FOR A DIGITAL PROPERTY TRANSFER EVENT OCCURRING WITHIN A DISTRIBUTED TRUST COMPUTING NETWORK COMPRISING A PLURALITY OF DECENTRALIZED NODES

1120 — IN RESPONSE TO RECEIVING THE REQUEST, COMMUNICATE A GEO-COORDINATE VALIDATION REQUEST TO THE PLURALITY OF NODES

1130 — IN RESPONSE TO RECEIVING THE GEO-COORDINATE VALIDATION REQUEST, OBTAIN, AT EACH NODE, GEO-COORDINATES THAT VERIFY A CURRENT GEOGRAPHIC LOCATION OF A CORRESPONDING NODE

1140 — COMMUNICATE, AT EACH NODE, THE GEO-COORDINATES TO AT LEAST ONE DESIGNATED NODE

1150 — APPLY, AT THE AT LEAST ONE DESIGNATED NODE, LOCATION-BASED AUTHORIZATION RULES TO THE GEO-COORDINATES TO DETERMINE WHICH NODES ARE LOCATED WITHIN PRE-DETERMINED GEO-BOUNDARIES

1160 — DETERMINE WHICH OF THE NODES ARE A CANDIDATE FOR CONSENSUS PARTICIPATION IN VALIDATING THE DIGITAL PROPERTY TRANSFER EVENT BASED AT LEAST ON WHICH NODES ARE LOCATED WITHIN THE PRE-DETERMINED GEO-BOUNDARIES

1170 — COMMUNICATE CONSENSUS CANDIDATE NOTIFICATIONS TO EACH NODE DETERMINED TO BE A CANDIDATE FOR CONSENSUS PARTICIPATION, WHEREIN RECEIPT OF THE CONSENSUS CANDIDATE NOTIFICATION BY A CORRESPONDING NODE DETERMINED TO BE A CANDIDATE FOR CONSENSUS PARTICIPATION, AUTHORIZES THE CORRESPONDING NODE TO PARTICIPATE IN A CONSENSUS PROCESS FOR VALIDATING THE DIGITAL PROPERTY TRANSFER EVENT

FIG. 7

HYBRID CONSENSUS MECHANISMS IN DISTRIBUTED TRUST COMPUTING NETWORKS IMPLICATING PROOF OF GEOGRAPHIC LOCATION

FIELD OF THE INVENTION

The present invention is related generally to consensus within distributed trust computing network, and, more specifically, validating nodes for participation in consensus mechanisms based on geo-coordinates of nodes in the network being within pre-defined geo-boundaries and, in some embodiments, proof that the node holds digital property.

BACKGROUND

In conventional digital property transfer events occurring within a distributed trust computing network, the decentralized nodes that participate in consensus processes are allowed to be located anywhere in the world. However, certain regulatory agencies and/or government bodies are unwilling to legalize digital property and/or related transfer events without assurance that an entirety of the digital property transfer event occurs within a geographic area that the regulatory agency and/or government body has jurisdiction over. In addition, such regulatory agencies and/or government bodies may institute other restrictions on the decentralized nodes that are authorized to participate in the consensus process, so as to protect against a node associated with a wrongdoer participating in the consensus process.

Therefore, a need exists to develop systems, methods, computer program products and the like that provide for validating/authorizing nodes for participation in consensus mechanisms implemented in distributed trust computing networks based at least on the geo-location of the nodes and, in some instances, other criteria, such as whether the node holds digital property of the type in digital property transfer event requiring consensus and the like.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing for a systems, devices and methods that validate/authorize nodes within a distributed trust computing network for participation in consensus mechanisms based at least on current geo-location of the node being within predefined geo-location boundaries (e.g., within the boundaries of a country or the like). As a result, the present invention provides assurance for any regulatory agency or governing body that mandates that all of the nodes participating in such consensus mechanisms be within jurisdiction boundaries. In additional embodiments of the invention, validation/authorization of nodes for participation in consensus mechanisms is based further on whether the node currently holds digital property consistent with the property involved in the digital property transfer event that precipitates the consensus mechanism.

According to embodiments of the invention, in response to a distributed trust computing network receiving a request for a digital property transfer event, such as cryptocurrency transaction or the like, a geo-coordinate validation request is issued to all of the nodes within the network. Subsequently the nodes obtain their current geo-coordinates. The node can obtain the geo-coordinates from a geo-receiver disposed within the node or otherwise connected to the node that is in synchronization with a geo-satellite for purposes of geo-coordinate communication. Alternatively, in the event that the geo-receiver is unable to currently receive signals from the geo-satellite, the node may receive geo-coordinates from another geo-receiver co-located with the node and connected to a device in communication with the node. In additional embodiments of the invention, in which the node is a fixed node and has pre-validated geo-coordinates, the geo-coordinated may be obtained from local or accessible storage.

In response to obtaining the geo-coordinates, the node communicates the geo-coordinates to a designated node(s) within the network at which location-based authorization rules are applied to determine which nodes are located within pre-determined geo-boundaries and, subsequently, determine which nodes are a candidate for consensus participation in validating the digital property transfer event based at least on which nodes are located within the pre-determined geo-boundaries.

In response, consensus candidate notifications are communicated to each node determined to be a candidate for consensus participation. Receipt of the consensus candidate notification by a corresponding node determined to be a candidate for consensus participation, authorizes the corresponding node to participate in a consensus process for validating the digital property transfer event. Subsequently, the consensus mechanism ensues with only authorized nodes participating in the consensus process. Once the digital property transfer event has been validated through the consensus process, a data block is added to an associated distributed ledger that includes the geo-coordinates of the nodes participating in the consensus process. Such storage of the nodes location within the data block provides irrefutable evidence that consensus process occurred with nodes located within the designated geo-boundaries.

In specific embodiments of the invention, the node obtains the geo-coordinates from the geo-receiver in an encrypted state and communicates the geo-coordinates to the designated node in the encrypted state without having decrypted the geo-coordinates at the node-level. In this regard, the geo-coordinates are not susceptible to intercepted and tampered with during communication or at the node. Decryption of the geo-coordinates only occurs prior to applying the location-based authorization rules to the geo-coordinates. Moreover, in specific embodiments of the invention, the geo-coordinates stored in the data blocks on the distributed ledger are in an encrypted state.

In other specific embodiments of the invention, as an added means of security, in addition to validating/authorizing nodes for consensus participation based on their geo-location, proof that a node holds digital property (i.e., the node's address or account has a balance in the digital property (e.g., cryptocurrency or tokens) or a specified amount of digital property that is issued on the distributed trust computing network) may be required to provide consensus participation authorization. Nodes that are able to demonstrate that they hold digital property provide assurance that the node is likely not controlled by a wrongdoer.

A system for authorizing nodes for consensus participation in digital property transfer events occurring within a distributed trust computing network defines first embodiments of the invention. The system includes the distributed trust computing network, which includes a plurality of nodes that are decentralized. Each node includes a memory and one or more processing devices in communication with the memory. The memory of the nodes is configured to store one or more distributed ledgers. Each distributed ledger includes one or more data blocks that store data that is validated through consensus of at least two of the plurality of nodes. The system additionally includes a consensus participation authorization application that is executable by at least one of the processing devices of each of the plurality of nodes. The consensus participation authorization application may be a standalone application or part of a comprehensive consensus application. The consensus participation authorization application is configured to receive a request for a digital property transfer event occurring within the distributed trust computing network, and, in response, communicate a geographic coordinate (geo-coordinate) validation request to the plurality of nodes. In response to the nodes receiving the geo-coordinate validation request, the consensus participation authorization application obtain, at each node, geo-coordinates that verify a current geographic location of a corresponding node and communicate the geo-coordinates to at least one designated node. At designated node(s), the consensus participation authorization application is configured to apply location-based authorization rules to the geo-coordinates to determine which nodes are located within pre-determined geo-boundaries and determine which nodes are a candidate for consensus participation in validating the digital property transfer event based at least on which nodes are located within the pre-determined geo-boundaries. Further, consensus participation authorization application is configured communicate consensus candidate notifications to each node determined to be a candidate for consensus participation, wherein receipt of the consensus candidate notification by a corresponding node, authorizes the corresponding node to participate in a consensus process for validating the digital property transfer event. In this regard, the notified nodes may participate in the consensus process but are not required to participate in the consensus process.

In specific embodiments the system further includes at least one first geo-receiver, in which each first geo-receiver is (i) either disposed within a node from amongst the plurality of nodes or connected to at least one node from amongst the plurality of nodes, and (ii) configured to receive the geo-coordinates of the node in which the first geo-receiver is disposed within or connected to from a synchronized geo-satellite. In such embodiments of the system, the consensus participation authorization application is further configured to obtain the geo-coordinates by receiving the geo-coordinates from the first geo-receiver. In related embodiments of the system, the at least one first geo-receiver includes an encryption algorithm configured to encrypt the geo-coordinates received from the synchronized geo-satellite. In such embodiments of the system, the consensus participation authorization application is further configured to obtain the geo-coordinates by receiving the geo-coordinates in an encrypted state from the first geo-receiver. Further, the consensus participation authorization application is further configured to communicate the geo-coordinates in the encrypted state to the at least one designated node, and decrypt, at the at least one designated node, the geo-coordinates prior to applying the location-based authorization rules.

In other related embodiments of the system, the consensus participation authorization application is further configured to determine that the first geo-receiver is unable to currently receive geo-coordinates from the synchronized geo-satellite, and, in response, obtain the geo-coordinates by receiving geo-coordinates from a second geo-receiver that is co-located with the corresponding node. In related embodiments of the system, either (i) the second geo-receiver includes an encryption algorithm configured to encrypt the geo-coordinates, and the consensus participation authorization application is further configured to obtain the geo-coordinates by receiving the geo-coordinates in an encrypted state from the second geo-receiver, or (ii) the corresponding node includes an encryption algorithm configured to encrypt the geo-coordinates received from the second geo-receiver prior to the geo-coordinates being communicated to the at one designated node. In further related embodiments of the system, the consensus participation authorization application is further configured to communicate the geo-coordinates in the encrypted state to the at least one designated node, and decrypt, at the at least one designated node, the geo-coordinates prior to applying the location-based authorization rules.

In other specific embodiments of the system, one or more of the plurality of nodes are fixed nodes that have pre-validated geo-coordinates. In such embodiments of the system, the consensus participation authorization application is further configured to obtain the geo-coordinates by obtaining the pre-validated geo-coordinates that verify a known fixed geographic location of the corresponding node.

In still further embodiments the system includes one or more consensus algorithms. Each consensus algorithm is executable by at least one of the processing devices of each of the plurality of nodes and is configured to validate the digital property transfer event via consensus of the nodes authorized to participate in the consensus process and generate a data block to be added to one of the distributed ledgers associated with a digital property being transferred. The data block includes the geo-coordinates, in an encrypted state, of nodes that participated in the consensus process.

Moreover, in other specific embodiments of the system, the consensus participation authorization application is further configured to, in response to receiving the request, communicate a digital property hold validation request to the plurality of nodes, and, in in response to the nodes receiving the digital property hold validation request, produce, at each node, data that verifies that the corresponding node holds digital property and communicate, at each node, the data to the least one designated node. Further, the consensus participation authorization application is configured to apply, at the at least one designated node, digital property holding rules to the data to determine which nodes satisfy the digital property holding rules. In such embodiments of the system, the consensus participation authorization application is further configured to determine which nodes are a candidate for consensus participation in validating the digital property transfer event based at least on which nodes are located within the pre-determined geo-boundaries and which nodes satisfy the digital property holding rules.

In additional specific embodiments of the system, the consensus participation authorization application is further configured to, in response to determining which nodes are located within pre-determined geo-boundaries, communicate a digital property hold validation request to the nodes determined to be located within the pre-determined geo-boundaries, and in response to the nodes receiving the digital property hold validation request, produce, at each node, data that verifies that the corresponding node holds digital property and communicate, at each node, the data to the least one designated node. Further, the consensus participation authorization application is configured to apply, at the at least one designated node, digital property holding rules to the data to determine which nodes satisfy the digital property holding rules. In such embodiments of the system, the consensus participation authorization application is further configured to determine which nodes are a candidate for consensus participation in validating the digital property transfer event based at least on which nodes are located within the pre-determined geo-boundaries and which nodes satisfy the digital property holding rules.

A computer-implemented method for authorizing nodes for consensus participation in digital property transfer events occurring within a distributed trust computing network defines second embodiments of the invention. The method is executable by one or more computing device processors. The method includes receiving a request for a digital property transfer event occurring within a distributed trust computing network comprising a plurality of decentralized nodes and, in response, communicating a geographic coordinate (geo-coordinate) validation request to the plurality of nodes. In response to the nodes receiving the geo-coordinate validation request, the method further includes obtaining, at each node, geo-coordinates that verify a current geographic location of a corresponding node and communicating, at each node, the geo-coordinates to at least one designated node. Further, the method includes applying, at the at least one designated node, location-based authorization rules to the received geo-coordinates to determine which nodes are located within pre-determined geo-boundaries and determining which of the nodes are a candidate for consensus participation in validating the digital property transfer event based at least on which nodes are located within the pre-determined geo-boundaries. In response, the method includes communicating consensus candidate notifications to each node determined to be a candidate for consensus participation. Receipt of the consensus candidate notification by a corresponding node determined to be a candidate for consensus participation, authorizes the corresponding node to participate in a consensus process for validating the digital property transfer event.

In specific embodiments of the method obtaining the geo-coordinates further includes receiving the geo-coordinates in an encrypted state from a first geo-receiver that is (i) disposed within or connected to a corresponding node and (ii) synchronized with a geo-satellite. In related embodiments of the method communicating, at each node, the geo-coordinates to at least one designated node further includes communicating the geo-coordinates in the encrypted state to the at least one designated node. In such embodiments the method further includes decrypting, at the at least one designated node, the geo-coordinates prior to applying the location-based authorization rules.

In other specific embodiments of the method, obtaining the geo-coordinates further includes determining that the first geo-receiver is unable to currently receive geo-coordinates from the synchronized geo-satellite, and, in response, obtaining the geo-coordinates by receiving geo-coordinates from a second geo-receiver that is co-located with the corresponding node. In such embodiments of the method, obtaining the geo-coordinates further comprises one of (i) receiving the geo-coordinates in an encrypted state from the second geo-receiver, or (ii) encrypting, at the corresponding node, the geo-coordinates received from the second geo-receiver prior to the geo-coordinates being communicated to the at one designated node. Additionally, in such embodiments, the method further includes communicating the geo-coordinates in the encrypted state to the at least one designated node; and decrypting, at the at least one designated node, the geo-coordinates prior to applying the location-based authorization rules.

In further specific embodiments the method further includes validating the digital property transfer event via consensus of the nodes authorized to participate in the consensus process and generating a data block to be added to one of the distributed ledgers associated with a digital property being transferred. The data block includes the geo-coordinates, in an encrypted state, of nodes that participated in the consensus process.

In still further specific embodiments the method includes, in response to receiving the digital property hold validation request, producing, at each node, data that verifies that the corresponding node holds digital property, communicating, at each node, the data to the least one designated node apply, at the at least one designated node, digital property holding rules to the data to determine which nodes satisfy the digital property holding rules. In such embodiments of the method determining which of the nodes are a candidate for consensus participation further includes determining which of the nodes are a candidate for consensus participation in validating the digital property transfer event based at least on which nodes are located within the pre-determined geo-boundaries and which nodes satisfy the digital property holding rules.

A computer program product including a non-transitory computer-readable medium including sets of codes for causing one or more computing devices to receive a request for a digital property transfer event occurring within a distributed trust computing network comprising a plurality of decentralized nodes, and, in response to receiving the request, communicate a geographic coordinate (geo-coordinate) validation request to the plurality of nodes. In response to receiving the geo-coordinate validation request, the sets of codes further cause the computing device(s) to obtain, at each node, geo-coordinates that verify a current geographic location of a corresponding node and communicate, at each node, the geo-coordinates to at least one designated node. In addition the sets of codes further cause the computing device(s) to (i) apply, at the at least one designated node, location-based authorization rules to the geo-coordinates to determine which nodes are located within pre-determined geo-boundaries, (ii) determine which of the nodes are a candidate for consensus participation in validating the digital property transfer event based at least on which nodes are located within the pre-determined geo-boundaries, and (iii) communicate consensus candidate notifications to each node determined to be a candidate for consensus participation. Receipt of the consensus candidate notification by a corresponding node determined to be a candidate for consensus participation, authorizes the corresponding node to participate in a consensus process for validating the digital property transfer event.

In specific embodiments of the computer program product, in response to receiving the digital property hold validation request, the sets of codes further cause the one or more computing devices to produce, at each node, data that verifies that the corresponding node holds digital property, communicate, at each node, the data to the least one designated node and apply, at the at least one designated node, digital property holding rules to the data to determine which nodes satisfy the digital property holding rules. In such embodiments of the computer program product, the set of codes for causing the one or more computing devices to determine which of the nodes are a candidate for consensus participation are further configured to cause the computing device(s) to determine which of the nodes are a candidate for consensus participation in validating the digital property transfer event based at least on which nodes are located within the pre-determined geo-boundaries and which nodes satisfy the digital property holding rules.

Thus, according to embodiments of the invention, which will be discussed in greater detail below, the present invention provides for validation/authorization of nodes within a distributed trust computing network for participation in consensus mechanisms based at least on current geo-location of the node being within predefined geo-location boundaries. As a result, the present invention provides assurance for any regulatory agency or governing body that mandates that all of the nodes participating in such consensus mechanisms be within jurisdiction boundaries. In additional embodiments of the invention, validation/authorization of nodes for participation in consensus mechanisms is based further on whether the node currently holds digital property consistent with the property involved in the digital property transfer event that precipitates the consensus mechanism.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
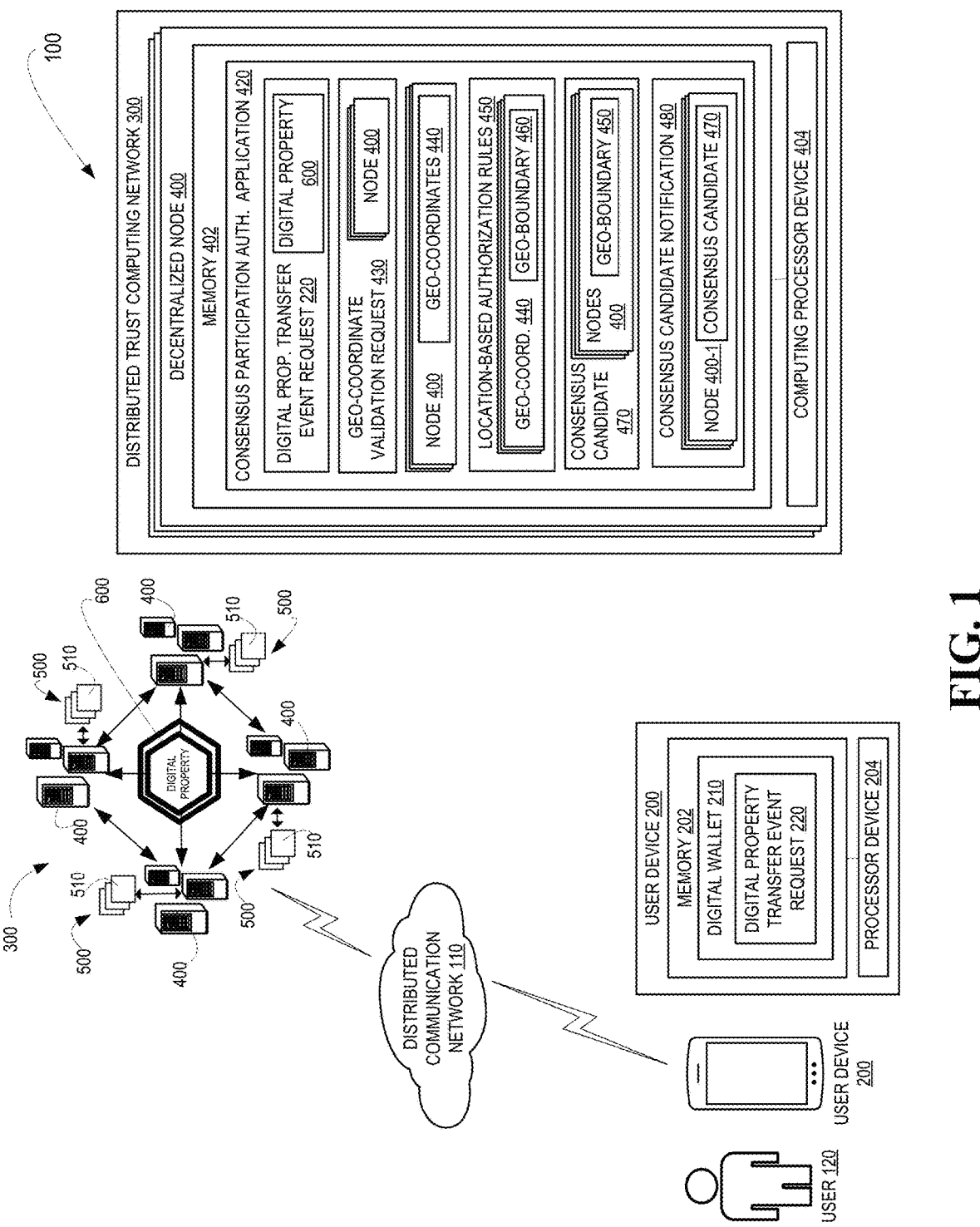
Figure 2:
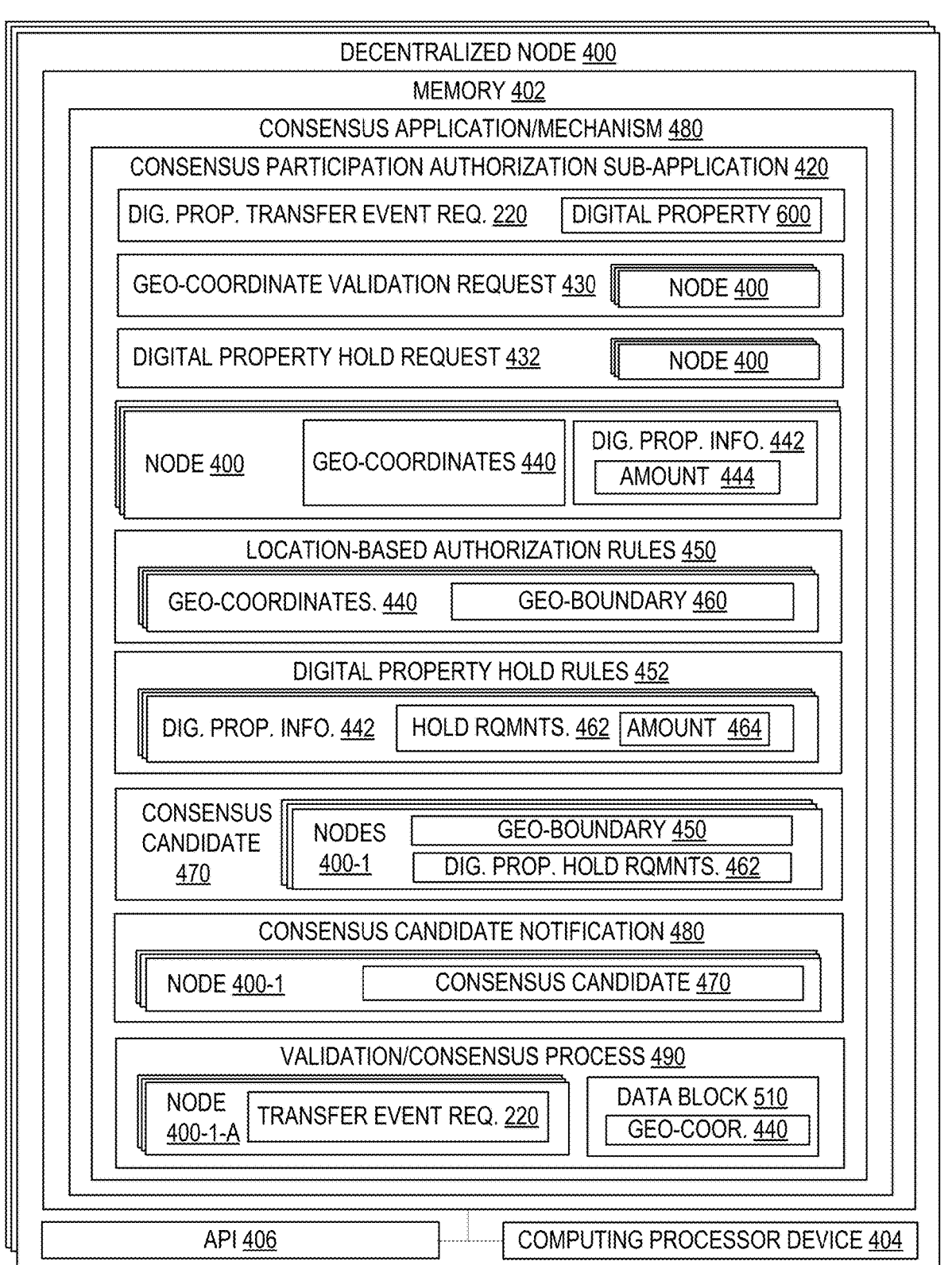
Figure 3:
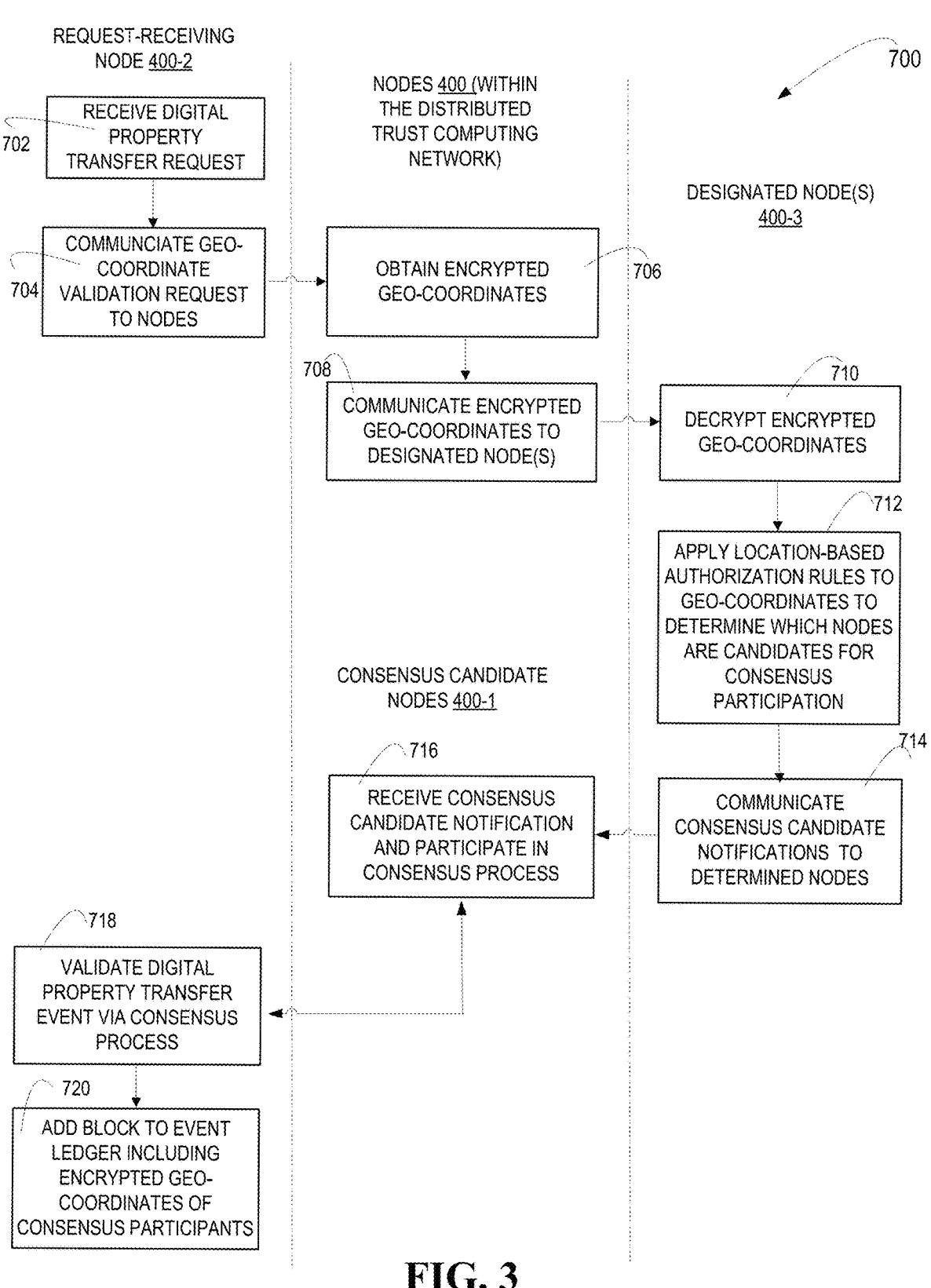
Figure 4:
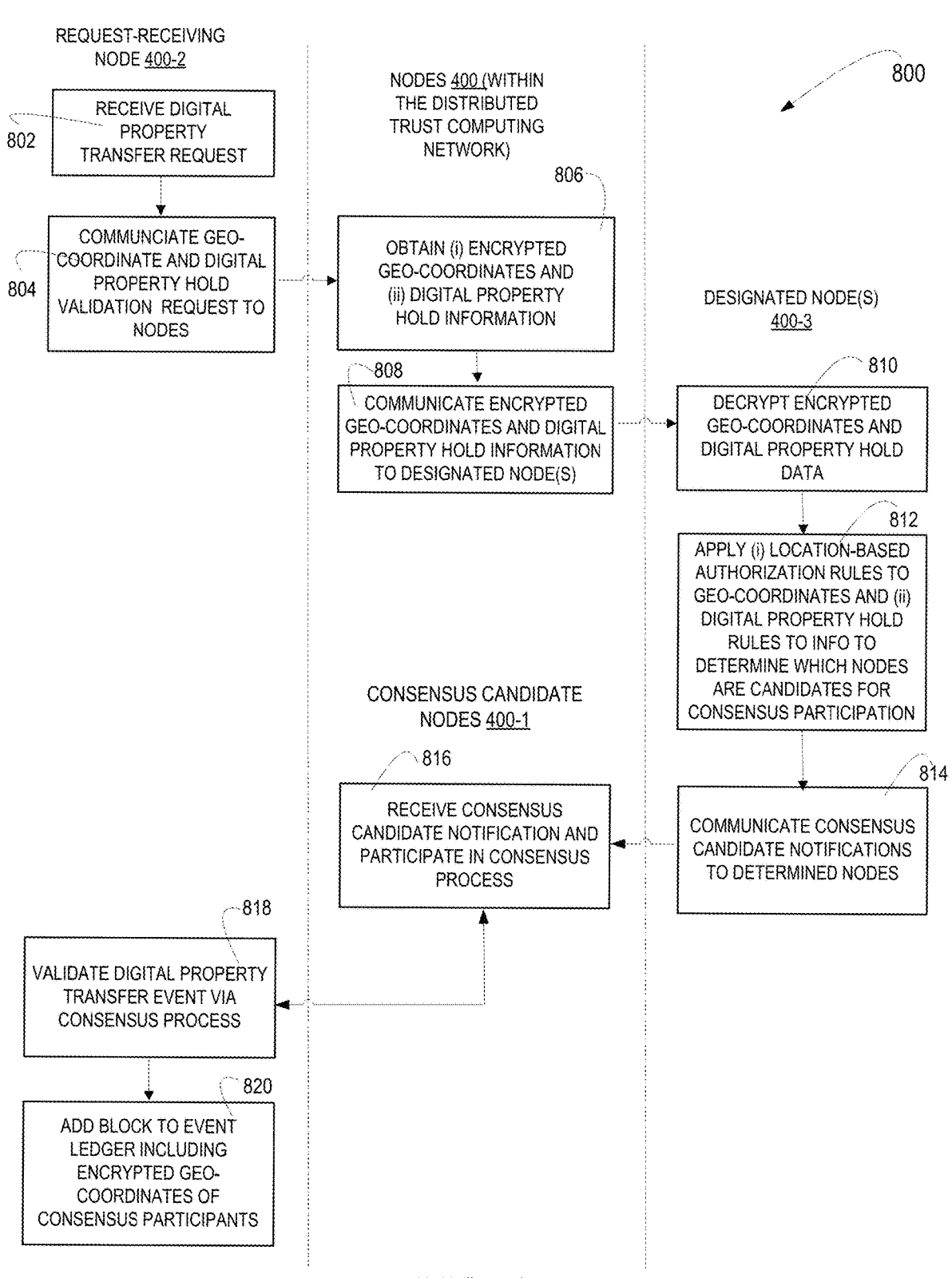
Figure 5:
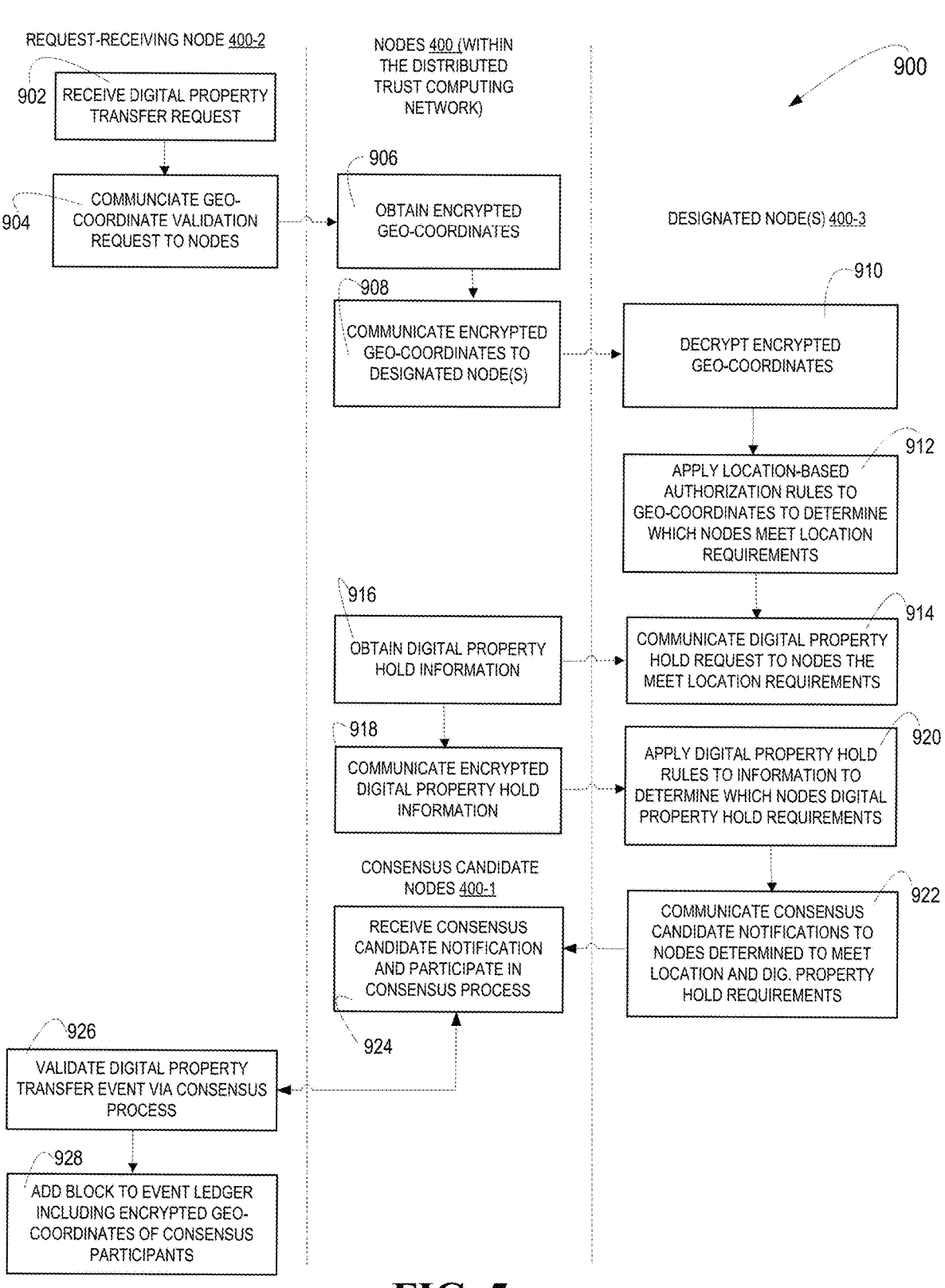
Figure 6:
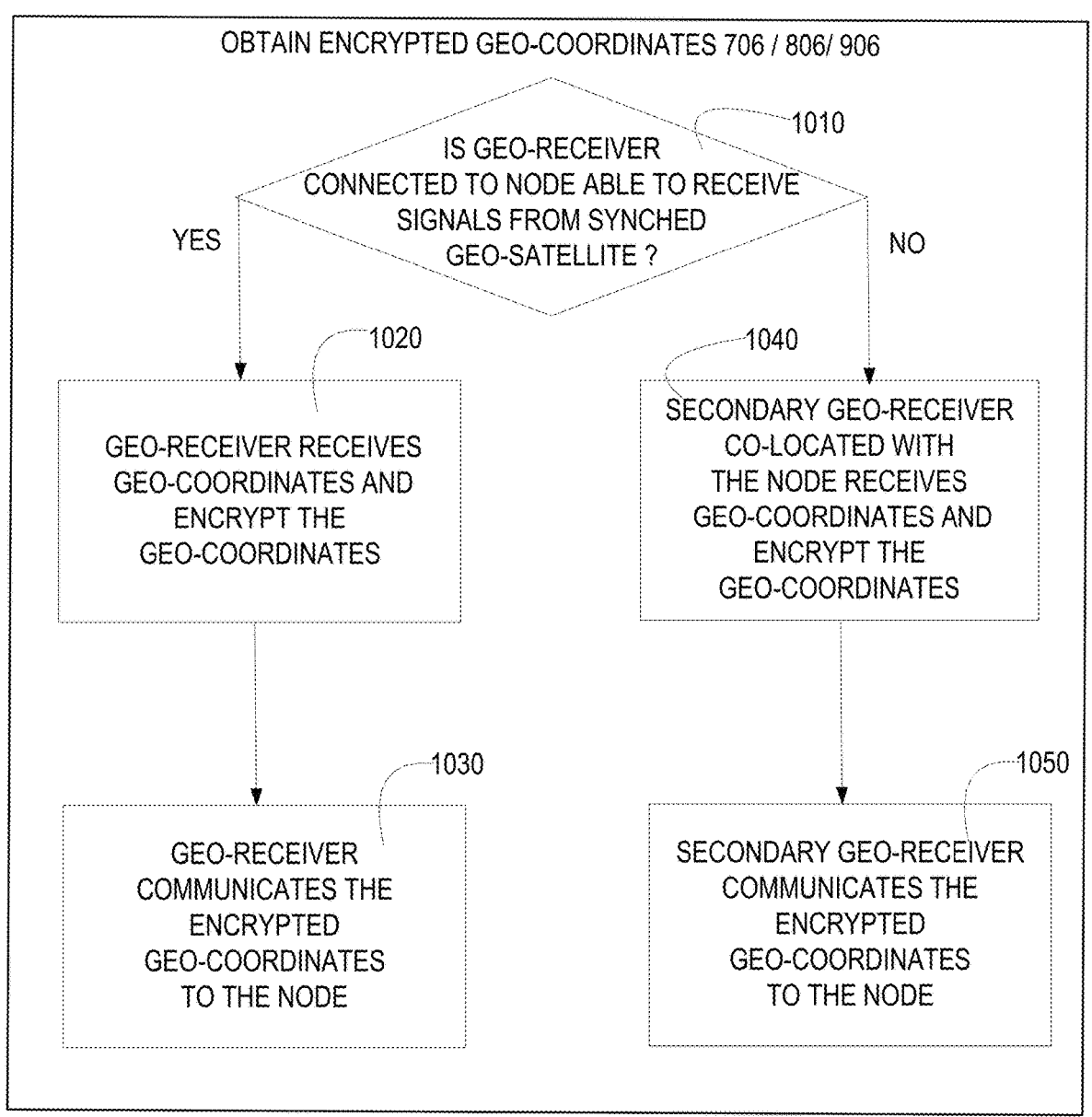

Having thus described embodiments of the disclosure in general terms, reference will now be made to the accompanying drawings, wherein:

FIG. 1 is a schematic/block diagram of a system for validating/authorizing nodes in a distributed trust computing network to participate in a digital property transfer event consensus process, in accordance with embodiments of the present invention;

FIG. 2 is block diagram of a node within a distributed trust computing network configured to execute a consensus application including a consensus participation authorization sub-application, in accordance with embodiments of the present invention;

FIG. 3 is a flow diagram of a method for validating/authorizing nodes for participation in a digital property transfer event consensus process based on geo-location of the nodes, in accordance with embodiments of the present invention;

FIG. 4 is a flow diagram of a method for validating/authorizing nodes for participation in a digital property transfer event consensus process based on geo-location of the nodes and digital property held by the nodes, in accordance with embodiments of the present invention;

FIG. 5 is flow diagram of an alternate method for validating/authorizing nodes for participation in a digital property transfer event consensus process based on geo-location of the nodes and digital property held by the nodes, in accordance with embodiments of the present invention;

FIG. 6 is flow diagram of a method for obtaining geo-coordinates at a node within a distributed trust computing network, in accordance with embodiments of the present invention; and FIG. 7 is a flow diagram of a method for validating/authorizing nodes in a distributed trust computing network to participate in a digital property transfer event consensus process, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

As the phrase is used herein, "distributed trust computing network" refers to a network of decentralized computing devices, referred to as nodes, which work as a consensus mechanism to verify and authenticate data and add the data as blocks to a distributed ledger stored within the network. One example of a distributed trust computing network is a blockchain network.

As the term is used herein, "digital property" includes anything that may be exchanged digitally, including, but not limited to, digital currency, such as cryptocurrency, Non-Fungible Tokens (NFTs), or the like.

As the phrase is used herein "digital property transfer event" is any event/transaction that involves digital property within a distributed trust computing network. For example, a digital property transfer event may include any transaction involving cryptocurrency including deposit, withdrawal, and transfer from one party to another (i.e., transfer from one distributed trust computing network to another).

As the phrase is used herein, "resource exchange device" refers to any device used to initiate processing of a resource exchange event. In this regard, "resource exchange device" may include a credit card, a debit card, credit/debit card or any other carded device configured for initiating a transaction.

Thus, according to embodiments of the invention, which will be described in more detail below, systems, methods and computer program products are disclosed that validate/authorize nodes within a distributed trust computing network for participation in consensus mechanisms. The validation/authorization is based at least on current geo-location of the node being within predefined geo-location boundaries (e.g., within the boundaries of a country or the like). As a result, the present invention provides assurance for any regulatory agency or governing body that mandates that all of the nodes participating in such consensus mechanisms be within jurisdiction boundaries. In additional embodiments of the invention, validation/authorization of nodes for participation in consensus mechanisms is based further on whether the node currently holds digital property consistent with the property involved in the digital property transfer event or holds a specified amount of the digital property.

According to embodiments of the invention, in response to a distributed trust computing network receiving a request for a digital property transfer event, such as cryptocurrency transaction or the like, a geo-coordinate validation request is issued to all of the nodes within the network. Subsequently the nodes obtain their current geo-coordinates. The node can obtain the geo-coordinates from a geo-receiver disposed within the node or otherwise connected to the node that is in synchronization with a geo-satellite for purposes of geo-coordinate communication. Alternatively, in the event that the geo-receiver is unable to currently receive signals from the geo-satellite, the node may receive geo-coordinates from another geo-receiver co-located with the node and connected to a device in communication with the node. In additional embodiments of the invention, in which the node is a fixed node and has pre-validated geo-coordinates, the geo-coordinated may be obtained from local or accessible storage.

In response to obtaining the geo-coordinates, the node communicates the geo-coordinates to a designated node(s) within the network at which location-based authorization rules are applied to determine which nodes are located within pre-determined geo-boundaries and, subsequently, determine which nodes are a candidate for consensus participation in validating the digital property transfer event based at least on which nodes are located within the pre-determined geo-boundaries.

In response, consensus candidate notifications are communicated to each node determined to be a candidate for consensus participation. Receipt of the consensus candidate notification by a corresponding node determined to be a candidate for consensus participation, authorizes the corresponding node to participate in a consensus process for validating the digital property transfer event. Subsequently, the consensus mechanism ensues with only authorized nodes participating in the consensus process. Once the digital property transfer event has been validated through the consensus process, a data block is added to an associated distributed ledger that includes the geo-coordinates of the nodes participating in the consensus process. Such storage of the nodes location within the data block provides irrefutable evidence that consensus process occurred with nodes located within the designated geo-boundaries.

In specific embodiments of the invention, the node obtains the geo-coordinates from the geo-receiver in an encrypted state and communicates the geo-coordinates to the designated node in the encrypted state without having decrypted the geo-coordinates at the node-level. In this regard, the geo-coordinates are not susceptible to intercepted and tampered with during communication or at the node. Decryption of the geo-coordinates only occurs prior to applying the location-based authorization rules to the geo-coordinates. Moreover, in specific embodiments of the invention, the geo-coordinates stored in the data blocks on the distributed ledger are in an encrypted state.

In other specific embodiments of the invention, as an added means of security, in addition to validating/authorizing nodes for consensus participation based on their geo-location, proof that a node holds digital property (i.e., the node's address or account has a balance in the digital property (e.g., cryptocurrency or tokens) or a specified amount of digital property that is issued on the distributed trust computing network) may be required to provide consensus participation authorization. Nodes that are able to demonstrate that they hold digital property provide assurance that the node is likely not controlled by a wrongdoer.

Referring to FIG. 1, a schematic/block diagram is presented of a system 100 for authorizing/validating nodes for participation in a distributed trust computing network consensus process, in accordance with embodiments of the invention. The system 100 is implemented in conjunction with a distributed communication network 110 that may include the Internet, one or more intranets, one or more cellular networks or the like. System 100 includes user device 200, which is in possession of user 120. The user device may be a mobile device, such as a mobile communication device (i.e., cellular/mobile telephone or the like). In other embodiments of the invention, user device may be a PC or the like. User device 200 includes a memory 202 and one or more computing processor devices 204 in communication with the memory 202. Memory 202 stores a digital wallet 210 that is executable by at least one of the computing processor devices 204 and is configured to initiate communication of a digital property transfer request 220 which requests transfer of a digital property, such as digital currency, an NFT or the like.

System 100 includes distributed trust computing network 300 that includes a plurality of decentralized nodes 400. The nodes 400 may be any computing devices having adequate computing processing capability, including servers (as shown in FIG. 1), PCs, mobile devices and the like. Each node 400 includes memory 402, and one or more computing processor devices 404 in communication with the memory. The collective memory 402 of the nodes 400 is configured to store or provide access to one or more distributed ledgers 500. Each distributed ledger 500 comprises one and, typically, more data blocks 510 that store data that has been validated through a consensus process executed by at least two and, typically more of the nodes 400. In this regard, the distributed nature of the ledgers 500 means that data blocks comprising a corresponding ledger 500 may be distributed amongst the memory 402 of multiple different nodes 400. In accordance with present invention, each distributed ledger 500 stored in or accessible to the distributed trust computing network 300 is associated with a specific digital property or type of digital property 600

According to embodiments of the system 100, the memory 402 of each node 402 stores or otherwise has access to consensus participation authorization application 420, which may be a standalone application or, as shown in FIG. 2, may be a sub-application/component of a consensus application. Consensus participation authorization application 420 is executable by at least one of a node's computing processor devices 404 and is configured to receive the digital property transfer event request 220, which is communicated from user device 200 and requests transfer of digital property 600, such as digital currency, an NFT or the like.

In response to receiving the digital property transfer event request 220, consensus participation authorization application 420 is configured to communicate geographic coordinate (i.e., geo-coordinate) validation requests 430 to all of the nodes 400 in the distributed trust computing network 300. In response to receiving the request 430, the nodes 400 obtain geo-coordinates 440 that verify a current geographic location of the corresponding node. It should be noted that nodes 400 that do not desire to participate in the consensus process may ignore the request (i.e., not obtain geo-coordinates 440). In response to obtaining geo-coordinates 440, the nodes 400 communicate the geo-coordinates to at least one designated node from amongst the plurality of nodes 400. In specific embodiments of the system 100, the designated node is (or includes) the node which received the digital property transfer event request 220, while in other embodiments of the system 100 the designated node may be a dedicated node. In specific embodiments of the invention, the geo-coordinates 440 are obtained in an encrypted state and communicated to the designated node in the encrypted state (i.e., without undergoing decryption at the node associated with the geo-coordinates 440). In this regard, the geo-coordinates 440 are not susceptible to being exposed during the geo-coordinate query process.

In response to receiving the geo-coordinates 440, the designated node(s) is configured to execute the consensus participation authorization application 420 and apply location-based authorization rules 450 to the geo-coordinates to determine which nodes 400 are located within pre-determined geo-boundaries 460. For example, the geo-boundaries 460 may define the borders of a country or other regulatory area or the like. In response, the consensus participation authorization application 420 is configured to determine which nodes 400-1 are a consensus candidate 470 for participation in validating the digital property transfer event based at least on which nodes 400 are located within the pre-determined geo-boundaries 450. In response to determining the consensus candidates 470, consensus participation authorization application 420 is configured to communicate consensus candidate notifications to each node 400-1 determined to be a consensus candidate 470. Receipt of the consensus candidate notification by a corresponding node 400-1 determined to be a consensus candidate 470, authorizes the corresponding node 400-1 to participate in a consensus process for validating the digital property transfer event. It should be noted that while a node 400-1 is authorized to participate in a consensus process, the node 400-1 is not required to participate in the consensus process.

Referring to FIG. 2, a block diagram is presented of the decentralized nodes 400 of distributed trust computing network 500 (shown in FIG. 1), in accordance with embodiments of the present invention. In addition to providing greater details of the consensus participation authorization application/sub-application 420, FIG. 2 highlights various alternate embodiments of the invention. Nodes 400 may comprise any computing device, such as servers, PCs, laptops, mobile devices or the like.

Nodes 400 includes memory 402, which may comprise volatile and/or non-volatile memory, such as read-only and/or random-access memory (RAM and ROM), EPROM, EEPROM, flash cards, or any memory common to computing platforms). Moreover, memory may comprise cloud storage, such as provided by a cloud storage service and/or a cloud connection service.

Further, nodes 400 includes one or more computing processor devices 404, which may be an application-specific integrated circuit ("ASIC"), or other chipset, logic circuit, or other data processing device. Computing processing device(s) 404 may execute one or more application programming interface (APIs) 406 that interface with any resident programs, such as consensus participation authorization application/sub-application 420, consensus application 480 or the like, stored in memory 402 of nodes 400 and any external programs. Nodes 400 may include various processing subsystems (not shown in FIG. 2 embodied in hardware, firmware, software, and combinations thereof, that enable the functionality of nodes 400 and the operability of nodes 400 on a distributed communication network 110 (shown in FIG. 1) such as the Internet, intranet(s), cellular network(s) and the like and distributed trust computing network 300, such as blockchain network or the like. For example, processing subsystems allow for initiating and maintaining communications and exchanging data with other networked devices. For the disclosed aspects, processing subsystems of nodes 400 may include any subsystem used in conjunction with consensus participation authorization application/sub-application 420 and/or consensus application/mechanism 480 and related tools, routines, sub-routines, applications, sub-applications, sub-modules thereof.

In specific embodiments of the present invention, nodes 400 additionally include a communications module (not shown in FIG. 2) embodied in hardware, firmware, software, and combinations thereof, that enables electronic communications between components of nodes 400 and other networks and network devices. Thus, communication module may include the requisite hardware, firmware, software and/or combinations thereof for establishing and maintaining a network communication connection with one or more devices and/or networks.

Memory 402 of nodes 400 stores consensus application/mechanism 480 which is executable by at least one of the one or more computing processor devices 404. Consensus application/mechanism 480 includes, as a sub-component, consensus participation authorization sub-application 420. As previously noted, consensus participation authorization application 420 may be a standalone application (as shown in FIG. 1) or a component of consensus application/mechanism 480. As previously discussed in relation to FIG. 1, consensus participation authorization application 420 is configured to receive the digital property transfer event request 220, which is communicated from user device 200 and requests transfer of digital property 600, such as digital currency, an NFT or the like.

In response to receiving the digital property transfer event request 220, consensus participation authorization application 420 is configured to communicate geographic coordinate (i.e., geo-coordinate) validation requests 430 to all of the nodes 400 in the distributed trust computing network 300. In alternate embodiments of the invention, in response to receiving the digital property transfer event request 220, consensus participation authorization application 420 is further configured to communicate digital property hold requests 432 to all of the nodes in the distributed trust computing network 300. In specific embodiments the requests 430 and 432 may be communicated in one consolidated request that includes both a geo-coordinate validation request 430 and a digital property hold request 432. In alternate embodiments of the invention (as shown and described in relation to FIG. 5), digital property hold requests 432 may be communicated after the designated nodes have applied the location-based authentication rules and determined which nodes 400-1 meet the geo-boundary 460 requirements.

In response to receiving the request 430, the nodes 400 obtain geo-coordinates 440 that verify a current geographic location of the corresponding node. It should be noted that nodes 400 that do not desire to participate in the consensus process may ignore the request (i.e., not obtain geo-coordinates 440).

In specific embodiments of the invention, geo-coordinates may be obtained from a geo-receiver/antenna in connection with the node 400 and, in specific embodiments in physical connection with the node 400. In such embodiments of the invention, the geo-receiver is in synchronization with a geo-satellite for receiving the geo-coordinates from the geo-satellite. Moreover, in further specific embodiments the geo-receiver includes one or more encryption algorithms for encrypting the geo-coordinates, such that the geo-coordinates obtained by node 400 are encrypted geo-coordinates.

In other embodiments of the invention, in which the geo-receiver connected to the node is unable to receive signals from the synched geo-satellite (e.g., due to positioning of the geo-satellite and/or geo-receiver), the geo-receiver may obtain geo-coordinates from another computing device that is in connected to another geo-receiver currently capable of receiving geo-coordinate signals and co-located (e.g., same dwelling) with the node. In such embodiments of the invention, the other computing device need not be a node within the distributed trust computing network 300. In such embodiments of the invention, the other geo-receiver may or may not include one or more encryption algorithms for encrypting the geo-coordinates. In those embodiments of the invention in which the other geo-receiver does not include encryption algorithm(s) the other computing device or the node may include and execute encryption algorithms, such that the geo-coordinates are encrypted, at least, prior to communication to the designated node(s).

In still further embodiments of the invention, nodes 400 may be fixed/stationary nodes that have pre-validated geo-coordinates. Such nodes may be members of a closed group of nodes 400, which may be co-located within a data center or the like. In such embodiments of the invention, obtaining the geo-coordinates may include accessing geo-coordinate storage (which may be locally memory within the node or remote memory, such as data center memory) to retrieve the node's pre-validated geo-coordinates.

In response to receiving the request 433, the nodes 400 obtain digital property hold information 442, which in some embodiments of the invention may include digital property amount 444 (or verification of a minimum amount). The digital property hold information 442 may include an encrypted public address and/or private key used to digital sign transfer events.

In response to obtaining geo-coordinates 440 and, in some embodiments digital property hold information 442, the nodes 400 communicate the geo-coordinates and, in some embodiments digital property hold information 442 to at least one designated node from amongst the plurality of nodes 400. In specific embodiments of the system 100, the designated node is (or includes) the node which received the digital property transfer event request 220, while in other embodiments of the system 100 the designated node may be a dedicated node. In specific embodiments of the invention, the geo-coordinates 440 are obtained in an encrypted state and communicated to the designated node in the encrypted state (i.e., without undergoing decryption at the node associated with the geo-coordinates 440). In this regard, the geo-coordinates 440 and digital property hold information 442 are not susceptible to being exposed during the geo-coordinate query process.

In response to receiving the geo-coordinates 440, the designated node(s) is configured to decrypt the geo-coordinates and execute the consensus participation authorization application 420 and apply location-based authorization rules 450 to the geo-coordinates to determine which nodes 400 are located within pre-determined geo-boundaries 460. For example, the geo-boundaries 460 may define the borders of a country or other regulatory area or the like.

In specific embodiments of the invention, in response to receiving the digital property hold information 442, the designated node(s) is configured to decrypt the digital property hold information 442 execute the consensus participation authorization application 420 and apply the digital property hold rules 452 to the digital property information 442 (e.g., use the public address and/or private key to access the distributed ledger(s) held by the corresponding node 400 to determine whether the node meets applicable digital property hold requirements 462 including in some embodiments a minimum amount threshold 464 or the like.

In response, the consensus participation authorization application 420 is configured to determine which nodes 400-1 are a consensus candidate 470 for participation in validating the digital property transfer event based at least on which nodes 400 are located within the pre-determined geo-boundaries 450 and, in some embodiments which nodes 400 meet the digital property hold requirements 462. In response to determining the consensus candidates 470, consensus participation authorization application 420 is configured to communicate consensus candidate notifications to each node 400-1 determined to be a consensus candidate 470. Receipt of the consensus candidate notification by a corresponding node 400-1 determined to be a consensus candidate 470, authorizes the corresponding node 400-1 to participate in a consensus process for validating the digital property transfer event. It should be noted that while a node 400-1 is authorized to participate in a validation/consensus process 490, the node 400-1 is not required to participate in the consensus process.

In specific embodiments of the invention, consensus application/mechanism 480 executes the validation/consensus process 490 in which nodes 400-1-A from amongst the consensus candidates 470 participate in validating the digital property transfer event 220. In response to validating the digital property transfer event, the consensus application/mechanism 480 add a data block 510 to a corresponding distributed ledger 500 which includes encrypted geo-coordinates 440 of the specific nodes 400-1-A which participated in the validation/consensus process 490. In this regard, the distributed trust computing network 300 stores immutable data that identifies the verified location of the nodes which participated in the validation/consensus process 490.

Referring to FIG. 3, a flow diagram is depicted of a method 700 for location-based validation/authorization of nodes for participation in consensus within a distributed trust computing network, in accordance with embodiments of the present invention. At Event 702, a digital property transfer event request is received at a node (400-2) within a distributed trust computing network, such as a blockchain network or the like. The digital property transfer event may be transaction involving digital currency, such as cryptocurrency, an NFT or the like. In response to receiving the request, at Event 704, geo-coordinate validation requests are communicated to the nodes (400) that comprise the distributed trust computing network. In response to receiving the geo-coordinate validation requests, at Event 706, the nodes (400) obtain their respective verified geo-coordinates. As previously discussed, geo-coordinates may be obtained from a geo-receiver/antenna connected to the node or, if the connected geo-receiver is unable to receive signals from the geo-satellite, the geo-coordinates may be obtained from a secondary geo-receiver antenna co-located with the node. In other instances, in which the node is fixed/stationary, the geo-coordinates may be pre-validated and stored in local memory or memory accessible to the node. At Event 708, the encrypted geo-coordinates are communicated to the designated node(s) (400-3). In preferred embodiments of the method, encryption occurs at the geo-receiver so as to ensure that the geo-coordinates are masked/encrypted while in possession of the node, while in alternate embodiments encryption may occur at the node itself. The designated node(s) (400-3) may be any node in the distributed trust computing including the request-receiving node (400-2).

In response to receiving the geo-coordinates, at Event 710, the designated node(s) (400-3) decrypt the encrypted geo-coordinates and, at Event 712, location-based authorization rules are applied to the geo-coordinates to determine which nodes (400) are consensus candidates (400-1) for participation in the consensus process (i.e., validation of the digital property transfer event). In specific embodiments, the location-based authorization rules define geo-boundaries (e.g., a country's borders) in which the node must be located within as a requirement for being a consensus candidate (400-1). In response to determining the consensus candidates (400-1), at Event 714, consensus candidate notifications are sent to the nodes (400-1) determined to be consensus candidates. The notifications serve to authorize a node (400-1) to participate in the consensus process but do not require that the node (400-1) participate in the consensus process.

At Event 716, the consensus candidates (400-1) receive the notification and, where applicable, participate in the consensus process. At Event 718, the digital property transfer event is validated via the consensus process participated in by consensus candidates (400-1). In response to validation, at Event 720, a data block is added to a corresponding distributed ledger of the distributed trust computing network that includes encrypted geo-coordinates of the nodes that participated in the consensus process.

Referring to FIG. 4, a flow diagram is depicted of a method 800 for location-based and digital property hold-based validation/authorization of nodes for participation in consensus within a distributed trust computing network, in accordance with embodiments of the present invention. At Event 802, a digital property transfer event request is received at a node (400-2) within a distributed trust computing network, such as a blockchain network or the like. The digital property transfer event may be transaction involving digital currency, such as cryptocurrency, an NFT or the like. In response to receiving the request, at Event 804, geo-coordinate and digital property hold validation requests are communicated to the nodes (400) that comprise the distributed trust computing network. In response to receiving the geo-coordinate and digital property hold validation requests, at Event 806, the nodes (400) obtain their respective verified geo-coordinates and digital hold property information. As previously discussed, geo-coordinates may be obtained from a geo-receiver/antenna connected to the node or, if the connected geo-receiver is unable to receive signals from the geo-satellite, the geo-coordinates may be obtained from a secondary geo-receiver antenna co-located with the node. In other instances, in which the node is fixed/stationary, the geo-coordinates may be pre-validated and stored in local memory or memory accessible to the node. Digital hold property information may include, but is not limited to, the public address and/or private key used to digital sign transfer events. At Event 808, the encrypted geo-coordinates and digital hold property information are communicated to the designated node(s) (400-3). In preferred embodiments of the method, encryption of the geo-coordinates occurs at the geo-receiver so as to ensure that the geo-coordinates are masked/encrypted while in possession of the node, while in alternate embodiments encryption of the geo-coordinates may occur at the node itself. The designated node(s) (400-3) may be any node in the distributed trust computing including the request-receiving node (400-2).

In response to receiving the encrypted geo-coordinates and digital property hold information, at Event 810, the designated node(s) (400-3) decrypt the encrypted geo-coordinates and encrypted digital property hold information and, at Event 812, location-based authorization rules are applied to the geo-coordinates and digital property hold rules are applied to the digital property hold information to determine which nodes (400) are consensus candidates (400-1) for participation in the consensus process (i.e., validation of the digital property transfer event). In specific embodiments, the location-based authorization rules define geo-boundaries (e.g., a country's borders) in which the node must be located within as a requirement for being a consensus candidate (400-1). In further specific embodiments of the method, the digital property hold rules may require a node to currently hold digital property of the type in the current transfer event and/or hold a specified pre-determined minimum amount of such digital property. In response to determining the consensus candidates (400-1), at Event 814, consensus candidate notifications are sent to the nodes (400-1) determined to be consensus candidates. The notifications serve to authorize a node (400-1) to participate in the consensus process but do not require that the node (400-1) participate in the consensus process.

At Event 816, the consensus candidates (400-1) receive the notification and, where applicable, participate in the consensus process. At Event 818, the digital property transfer event is validated via the consensus process participated in by consensus candidates (400-1). In response to validation, at Event 820, a data block is added to a corresponding distributed ledger of the distributed trust computing network that includes encrypted geo-coordinates of the nodes that participated in the consensus process.

Referring to FIG. 5, a flow diagram is depicted of a method 900 for location-based and digital property hold-based validation/authorization of nodes for participation in consensus within a distributed trust computing network, in accordance with embodiments of the present invention. The method 900 of FIG. 5 differs from the method 800 of FIG. 4 in that digital property-hold validation occurs only after a node has been validated based on geo-location. At Event 902, a digital property transfer event request is received at a node (400-2) within a distributed trust computing network, such as a blockchain network or the like. The digital property transfer event may be transaction involving digital currency, such as cryptocurrency, an NFT or the like. In response to receiving the request, at Event 904, geo-coordinate requests are communicated to the nodes (400) that comprise the distributed trust computing network. In response to receiving the geo-coordinate validation requests, at Event 906, the nodes (400) obtain their respective verified geo-coordinates. As previously discussed, geo-coordinates may be obtained from a geo-receiver/antenna connected to the node or, if the connected geo-receiver is unable to receive signals from the geo-satellite, the geo-coordinates may be obtained from a secondary geo-receiver antenna co-located with the node. In other instances, in which the node is fixed/stationary, the geo-coordinates may be pre-validated and stored in local memory or memory accessible to the node. At Event 908, the encrypted geo-coordinates are communicated to the designated node(s) (400-3). In preferred embodiments of the method, encryption of the geo-coordinates occurs at the geo-receiver so as to ensure that the geo-coordinates are masked/encrypted while in possession of the node, while in alternate embodiments encryption of the geo-coordinates may occur at the node itself. The designated node(s) (400-3) may be any node in the distributed trust computing including the request-receiving node (400-2).

In response to receiving the encrypted geo-coordinates, at Event 910, the designated node(s) (400-3) decrypt the encrypted geo-coordinates and, at Event 912, location-based authorization rules are applied to the geo-coordinates are applied to the digital property hold information to determine which nodes (400) meet the location requirements. In specific embodiments, the location-based authorization rules define geo-boundaries (e.g., a country's borders) in which the node must be located within as a requirement for being a consensus candidate (400-1).

In response to determining which nodes meet the location requirements, at Event 914, digital property hold requests are communicated to the nodes that meet the location requirements. In response to receiving the digital property hold requests, at Event 916, the nodes obtain digital property hold information. Digital hold property information may include, but is not limited to, the public address and/or private key used to digital sign transfer events and, in some instances the amount or verification of a minimum amount of the digital property. At Event 918, the digital property hold information is communicated to the designated nodes(s) (400-3). In specific embodiments of the method, the digital property hold information is encrypted prior to communicating the data to the designated node(s). In response to receiving the digital property hold data, at Event 920, digital property hold rules are applied to the digital property hold information to determine which nodes meet the digital property hold requirements. The digital property hold requirements may require a node to currently hold digital property of the type in the current transfer event and/or hold a specified pre-determined minimum amount of such digital property. In response to determining which nodes meet the digital property hold requirements, at Event 922, consensus candidate notifications are communicated to the nodes (400-1) that have been determined to meet both the location requirements/rules and the digital property hold requirement/rules (i.e., nodes determined to be consensus candidates (400-1)). The notifications serve to authorize a node (400-1) to participate in the consensus process but do not require that the node (400-1) participate in the consensus process.

At Event 924, the consensus candidates (400-1) receive the notification and, where applicable, participate in the consensus process. At Event 926, the digital property transfer event is validated via the consensus process participated in by consensus candidates (400-1). In response to validation, at Event 928, a data block is added to a corresponding distributed ledger of the distributed trust computing network that includes encrypted geo-coordinates of the nodes that participated in the consensus process.

Referring to FIG. 6 a flow diagram is presented of a method 1000 for obtaining encrypted geo-coordinates, in accordance with embodiments of the present invention. The shown in FIG. 6 and described herein is provided for in Events 706, 806 and 906 of corresponding methods 700, 800 and 900 shown in corresponding FIGS. 3, 4 and 5. At Decision 1010, a determination is made as to whether the geo-receiver/antenna connected to the node is able to receive signals from the synched geo-satellite. If the geo-receive/antenna is able to receive signals for the satellite, at Event 1020, the geo-receiver receives the geo-coordinates and encrypts the geo-coordinates and, at Event 1030, communicates the encrypted geo-coordinates to the node.

If the geo-receiver/antenna is unable to receive signals from the geo-satellite, at Event 1040, a secondary geo-receiver that is co-located (e.g., in the same dwelling or complex) with the node receives the geo-coordinates from a geo-satellite and encrypts the geo-coordinates and, at Event 1050, communicates the encrypted geo-coordinates to the node. In specific embodiments of the invention, the secondary geo-receiver may directly communicate the geo-coordinates to the node or another computing device, which may be a node that is connected to the secondary geo-receiver may communicate the encrypted geo-coordinates to the node.

Referring to FIG. 7, a flow diagram is presented of a method 1100 for validating/authorizing nodes for participation in a digital property transfer event consensus process within a distributed trust computing network, in accordance with embodiments of the present invention. At Event 1110, a request for a digital property transfer event is received by a node of a digital trust computing network, such as a blockchain network. The digital property transfer event may be a transaction involving digital currency, such as cryptocurrency or an NFT. In response to receiving the request, at Event 1120, geo-coordinate validation requests are communicated to the nodes that comprise the distributed trust computing network.

In response to receiving the geo-coordinate validation requests, at Event 1130, the nodes obtain their respective geo-coordinates that serve to verify the current geo-location of the corresponding node. As previously discussed, geo-coordinates may be obtained from a geo-receiver/antenna connected to the node or, if the connected geo-receiver is unable to receive signals from the geo-satellite, the geo-coordinates may be obtained from a secondary geo-receiver antenna co-located with the node. In other instances, in which the node is fixed/stationary, the geo-coordinates may be pre-validated and stored in local memory or memory accessible to the node. In response to obtaining the geo-coordinates, at Event 1140, the geo-coordinates are communicated to a designated node(s), which may include the node receiving the digital property transfer event request.

At Event 1150, the designated node(s) apply location-based authorization rules to the geo-coordinates to determine, at least, which nodes are located within pre-determined boundaries, such as, which nodes are located within the borders of a country or regulatory region/area. At Event 1160, a determination is made to which nodes are a candidate for consensus participation in validating the digital property transfer event. The determination is based, at least, on which nodes are located within pre-determined boundaries or otherwise meet the location-based authorization rules.

In responding to determining which nodes are a candidate for consensus participation, at Event 1170, the designated nodes communicate consensus candidate notifications to each node determined to be candidates for the consensus participation. Receipt of the consensus candidate notification by a corresponding node authorizes (but does not mandate) the node to participate in a consensus process for validating the digital property transfer event Thus, present embodiments of the invention discussed in detail above, provides for validation/authorization of nodes within a distributed trust computing network for participation in consensus mechanisms based at least on current geo-location of the node being within predefined geo-location boundaries. As a result, the present invention provides assurance for any regulatory agency or governing body that mandates that all of the nodes participating in such consensus mechanisms be within jurisdiction boundaries. In additional embodiments of the invention, validation/authorization of nodes for participation in consensus mechanisms is based further on whether the node currently holds digital property consistent with the property involved in the digital property transfer event that precipitates the consensus mechanism.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for authorizing nodes for consensus participation in digital property transfer events occurring within a distributed trust computing network, the system comprising:

the distributed trust computing network comprising a plurality of nodes that are decentralized, each node having a memory and one or more processing devices in communication with the memory, wherein the memory of the nodes is configured to store one or more distributed ledgers, each distributed ledger comprising one or more data blocks that store data that is validated through consensus of at least two of the plurality of nodes;

at least one first geo-receiver, wherein each first geo-receiver is disposed within a node from amongst the plurality of nodes or connected to at least one node from amongst the plurality of nodes, wherein each first geo-receiver is configured to receive the geo-coordinates of a node in which the first geo-receiver is disposed within or connected to from a synchronized geo-satellite, wherein the at least one first geo-receiver includes an encryption algorithm configured to encrypt the geo-coordinates received from the synchronized geo-satellite, and wherein the consensus participation authorization application is further configured to obtain the geo-coordinates by receiving the geo-coordinates in an encrypted state from the first geo-receiver; and a consensus participation authorization application executable by at least one of the processing devices of each of the plurality of nodes and configured to:

receive a request for a digital property transfer event occurring within the distributed trust computing network, in response to receiving the request, communicate a geo-coordinate validation request to the plurality of nodes, in response to receiving the geo-coordinate validation request, obtain, at each node, geo-coordinates that verify a current geographic location of a corresponding node, wherein the geo-coordinates are encrypted, communicate, at each node, the encrypted geo-coordinates to at least one designated node, apply, at the at least one designated node, location-based authorization rules to the geo-coordinates to determine which nodes are located within pre-determined geo-boundaries, wherein applying further comprises decrypting the geo-coordinates prior to applying the location-based authorization rules, determine which nodes are a candidate for consensus participation in validating the digital property transfer event based at least on which nodes are located within the pre-determined geo-boundaries, and communicate consensus candidate notifications to each node determined to be a candidate for consensus participation, wherein receipt of the consensus candidate notification by a corresponding node determined to be a candidate for consensus participation, authorizes the corresponding node to participate in a consensus process for validating the digital property transfer event, wherein the consensus participation authorization application is further configured to obtain the geo-coordinates by receiving the geo-coordinates from the first geo-receiver.

2. The system of claim 1, further wherein the consensus participation authorization application is further configured to:

determine that the first geo-receiver is unable to currently receive geo-coordinates from the synchronized geo-satellite, and in response to determining that the first geo-receiver is unable to currently receive geo-coordinates from the synchronized geo-satellite, obtain the geo-coordinates by receiving geo-coordinates from a second geo-receiver that is co-located with the corresponding node.

3. The system of claim 2, wherein at least one of:

(i) the second geo-receiver includes an encryption algorithm configured to encrypt the geo-coordinates, and wherein the consensus participation authorization application is further configured to obtain the geo-coordinates by receiving the geo-coordinates in an encrypted state from the second geo-receiver, and (ii) the corresponding node includes an encryption algorithm configured to encrypt the geo-coordinates received from the second geo-receiver prior to the geo-coordinates being communicated to the at one designated node.

4. The system of claim 3, wherein the consensus participation authorization application is further configured to:

communicate the geo-coordinates in the encrypted state to the at least one designated node, and decrypt, at the at least one designated node, the geo-coordinates prior to applying the location-based authorization rules.

5. The system of claim 1, wherein one or more of the plurality of nodes are fixed nodes that have pre-validated geo-coordinates, wherein the consensus participation authorization application is further configured to obtain the geo-coordinates by obtaining the pre-validated geo-coordinates that verify a known fixed geographic location of the corresponding node.

6. The system of claim 1, further comprising one or more consensus algorithms, each consensus algorithm executable by at least one of the processing devices of each of the plurality of nodes and configured to:

validate the digital property transfer event via consensus of the nodes authorized to participate in the consensus process, and generate a data block to be added to one of the distributed ledgers associated with a digital property being transferred, wherein the data block includes the geo-coordinates, in an encrypted state, of nodes that participated in the consensus process.

7. The system of claim 1, wherein the consensus participation authorization application is further configured to:

in response to receiving the request, communicate a digital property hold validation request to the plurality of nodes, in response to receiving the digital property hold validation request, produce, at each node, data that verifies that the corresponding node holds digital property, communicate, at each node, the data to the least one designated node, and apply, at the at least one designated node, digital property holding rules to the data to determine which nodes satisfy the digital property holding rules, and wherein the consensus participation authorization application is further configured to determine which nodes are a candidate for consensus participation in validating the digital property transfer event based at least on which nodes are located within the pre-determined geo-boundaries and which nodes satisfy the digital property holding rules.

8. The system of claim 1, wherein the consensus participation authorization application is further configured to:

in response to determining which nodes are located within pre-determined geo-boundaries, communicate a digital property hold validation request to the nodes determined to be located within the pre-determined geo-boundaries, in response to receiving the digital property hold validation request, produce, at each node, data that verifies that the corresponding node holds digital property, communicate, at each node, the data to the least one designated node, apply, at the at least one designated node, digital property holding rules to the data to determine which nodes satisfy the digital property holding rules, and wherein the consensus participation authorization application is further configured to determine which nodes are a candidate for consensus participation in validating the digital property transfer event based at least on which nodes are located within the pre-determined geo-boundaries and which nodes satisfy the digital property holding rules.

9. A computer-implemented method for authorizing nodes for consensus participation in digital property transfer events occurring within a distributed trust computing network, the method being executable by one or more computing device processors and comprising:

receiving a request for a digital property transfer event occurring within a distributed trust computing network comprising a plurality of decentralized nodes;

in response to receiving the request, communicating a geo-coordinate validation request to the plurality of nodes;

in response to receiving the geo-coordinate validation request, obtaining, at each node, geo-coordinates that verify a current geographic location of a corresponding node, wherein obtaining the geo-coordinates further comprises receiving the geo-coordinates from a first geo-receiver that is disposed within or connected to a corresponding node, wherein obtaining the geo-coordinates further comprises receiving the geo-coordinates in an encrypted state from the first geo-receiver that is synchronized with a geo-satellite;

communicating, at each node, the encrypted geo-coordinates to at least one designated node;

applying, at the at least one designated node, location-based authorization rules to the geo-coordinates to determine which nodes are located within pre-determined geo-boundaries, wherein applying further comprises decrypting the geo-coordinates prior to applying the location-based authorization rules;

determining which of the nodes are a candidate for consensus participation in validating the digital property transfer event based at least on which nodes are located within the pre-determined geo-boundaries; and communicating consensus candidate notifications to each node determined to be a candidate for consensus participation, wherein receipt of the consensus candidate notification by a corresponding node determined to be a candidate for consensus participation, authorizes the corresponding node to participate in a consensus process for validating the digital property transfer event.

10. The computer-implemented method of claim 9, wherein obtaining the geo-coordinates further comprises:

determining that the first geo-receiver is unable to currently receive geo-coordinates from the synchronized geo-satellite, and in response to determining that the first geo-receiver is unable to currently receive geo-coordinates from the synchronized geo-satellite, obtaining the geo-coordinates by receiving geo-coordinates from a second geo-receiver that is co-located with the corresponding node.

11. The computer-implemented method of claim 10, wherein obtaining the geo-coordinates further comprises one of (i) receiving the geo-coordinates in an encrypted state from the second geo-receiver, or (ii) encrypting, at the corresponding node, the geo-coordinates received from the second geo-receiver prior to the geo-coordinates being communicated to the at one designated node, and the method further includes communicating the geo-coordinates in the encrypted state to the at least one designated node; and decrypting, at the at least one designated node, the geo-coordinates prior to applying the location-based authorization rules.

12. The computer-implemented method of claim 9, further comprising:

validating the digital property transfer event via consensus of the nodes authorized to participate in the consensus process; and generating a data block to be added to one of the distributed ledgers associated with a digital property being transferred, wherein the data block includes the geo-coordinates, in an encrypted state, of nodes that participated in the consensus process.

13. The computer-implemented method of claim 9, further comprising:

in response to receiving the digital property hold validation request, producing, at each node, data that verifies that the corresponding node holds digital property, communicating, at each node, the data to the least one designated node, and applying, at the at least one designated node, digital property holding rules to the data to determine which nodes satisfy the digital property holding rules, and wherein determining which of the nodes are a candidate for consensus participation further comprises determining which of the nodes are a candidate for consensus participation in validating the digital property transfer event based at least on which nodes are located within the pre-determined geo-boundaries and which nodes satisfy the digital property holding rules.

14. A computer program product comprising:

a non-transitory computer-readable medium comprising sets of codes for causing one or more computing devices to:

receive a request for a digital property transfer event occurring within a distributed trust computing network comprising a plurality of decentralized nodes;

in response to receiving the request, communicate a geo-coordinate validation request to the plurality of nodes;

in response to receiving the geo-coordinate validation request, obtain, at each node, geo-coordinates that verify a current geographic location of a corresponding node, wherein obtaining the geo-coordinates further comprises receiving the geo-coordinates from a first geo-receiver that is disposed within or connected to a corresponding node, wherein obtaining the geo-coordinates further comprises receiving the geo-coordinates in an encrypted state from the first geo-receiver that is synchronized with a geo-satellite;

communicate, at each node, the encrypted geo-coordinates to at least one designated node;

apply, at the at least one designated node, location-based authorization rules to the geo-coordinates to determine which nodes are located within pre-determined geo-boundaries, wherein applying further comprises decrypting the geo-coordinates prior to applying the location-based authorization rules;

determine which of the nodes are a candidate for consensus participation in validating the digital property transfer event based at least on which nodes are located within the pre-determined geo-boundaries; and communicate consensus candidate notifications to each node determined to be a candidate for consensus participation, wherein receipt of the consensus candidate notification by a corresponding node determined to be a candidate for consensus participation, authorizes the corresponding node to participate in a consensus process for validating the digital property transfer event.

15. The computer program product of claim 14, wherein the sets of codes further cause the one or more computing devices to:

in response to receiving the digital property hold validation request, produce, at each node, data that verifies that the corresponding node holds digital property;

communicate, at each node, the data to the least one designated node; and apply, at the at least one designated node, digital property holding rules to the data to determine which nodes satisfy the digital property holding rules, and wherein the set of codes for causing the one or more computing devices to determine which of the nodes are a candidate for consensus participation are further configured to cause the one or more computing devices to determine which of the nodes are a candidate for consensus participation in validating the digital property transfer event based at least on which nodes are located within the pre-determined geo-boundaries and which nodes satisfy the digital property holding rules.

* * * * *